Nov. 16, 1965   F. HALBERSCHMIDT   3,218,069
SHEET HANDLING APPARATUS
Filed June 14, 1962   6 Sheets-Sheet 1

Fig. 1

INVENTOR.
FRIEDRICH HALBERSCHMIDT
BY
Bauer and Seymour
ATTORNEYS 3,218,069
SHEET HANDLING APPARATUS
Friedrich Halberschmidt, Merkstein, near Aachen, Germany, assignor to Compagnie de Saint-Gobain, Neuilly-sur-Seine, France
Filed June 14, 1962, Ser. No. 202,601
Claims priority, application France, June 16, 1961, 865,164
21 Claims. (Cl. 271—69)

The present invention relates to a means for transferring sheets of glass from one position to another. More specifically it relates to a suction means for picking up a sheet of glass moving along a conveyor, raising it above the conveyor, moving it parallel to its plane to a position over another conveyor, and then lowering the sheet onto said other conveyor.

In the production of glass sheets of predetermined sizes glass sheets of varying widths are fed along a main conveyor and are then distributed to one or several secondary conveyors to be fed to sheet trimming or cutting mechanisms operatively associated with the secondary conveyors. In the present state of the art the secondary conveyor is a cross conveyor which overlaps the main conveyor and can be raised or retracted with respect to the latter. When a sheet of glass coming from the main conveyor is to be laterally carried by the secondary conveyor, its arrival causes, for instance by abutment against a contactor, the raising of the secondary conveyor on which it comes to rest and by which it is carried in the desired direction. When the sheet moved in this manner has cleared the secondary conveyor the latter retracts to assume its original overlapping position. It can be seen that the output of this device is limited by the fact that when the secondary conveyor is in raised position no sheet can be advanced on the main conveyor until after the previously fed sheet has been deposited by the secondary conveyor and it has returned to its original position in relation to the main conveyor. It is obvious that the main conveyor must be stopped or that the sheets of glass on the main conveyor must be spaced a considerable distance apart so that subsequent sheets will not be moved into position while the secondary conveyor is in raised position. It is obvious that the number of sheets that such a device can handle in a set period of time is considerably limited. The device of this invention remedies this drawback and offers in addition a certain number of other advantages which will become apparent in the description that follows.

One object of the present invention is to provide an apparatus for quickly and efficiently transferring sheets of glass from a path of movement in one direction to a path of movement in another direction.

Another object is to provide an apparatus for sequentially transferring a series of glass sheets from a main conveyor to a secondary conveyor wherein both of said conveyors are continuously operated.

Another object is to provide an apparatus for sequentially transferring a series of glass sheets from a main conveyor to a secondary conveyor without limiting the spacing of the glass sheets on the main conveyor.

Another object is to provide an apparatus for sequentially transferring a series of glass sheets from a main conveyor to a secondary conveyor wherein each sheet is placed at the same location on the secondary conveyor regardless of the width of the glass sheet.

Another object is to provide an apparatus for transferring glass sheets from a main conveyor to a secondary conveyor wherein the glass sheets on the main conveyor are of varying widths.

Another object is to provide an apparatus for transferring glass sheets from a main conveyor to a secondary conveyor wherein the glass sheets on the main conveyor are of varying widths and wherein each sheet is automatically engaged at its center.

A still further object is to provide an apparatus for transferring glass sheets from a main conveyor to a secondary conveyor wherein the orientation of the glass sheet in relation to the main and secondary conveyors remains constant.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views.

Figure 1:
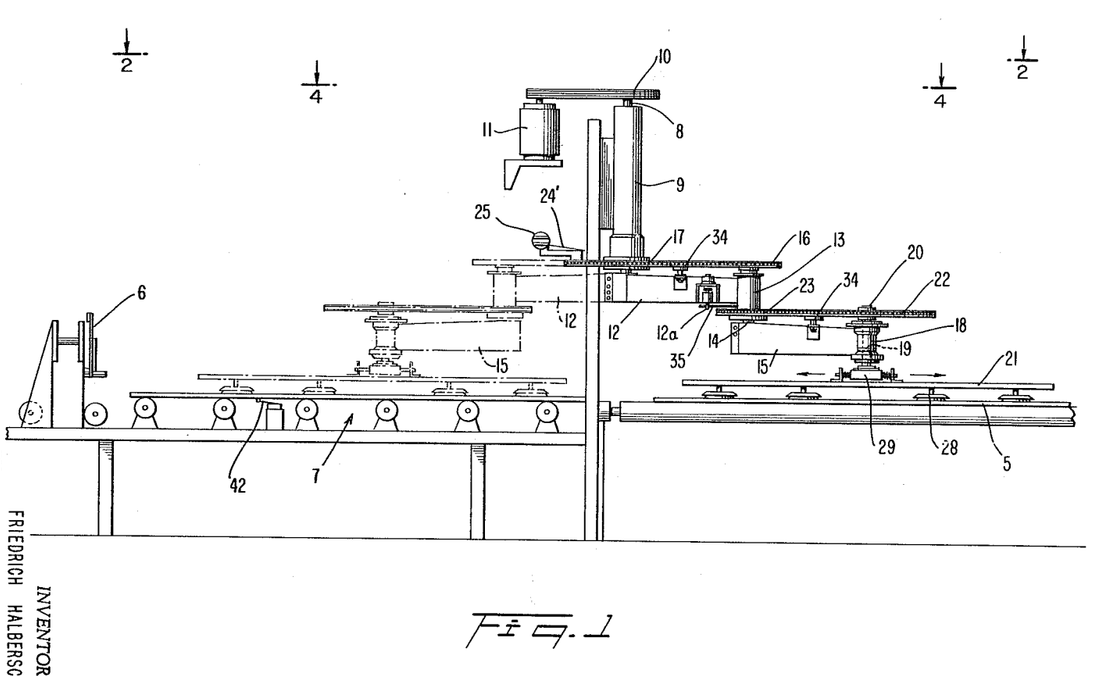
FIG. 1 is a side elevation view showing in dot-dash lines the position of sheet transfer means over the secondary conveyor.
Figures 2, 2A:
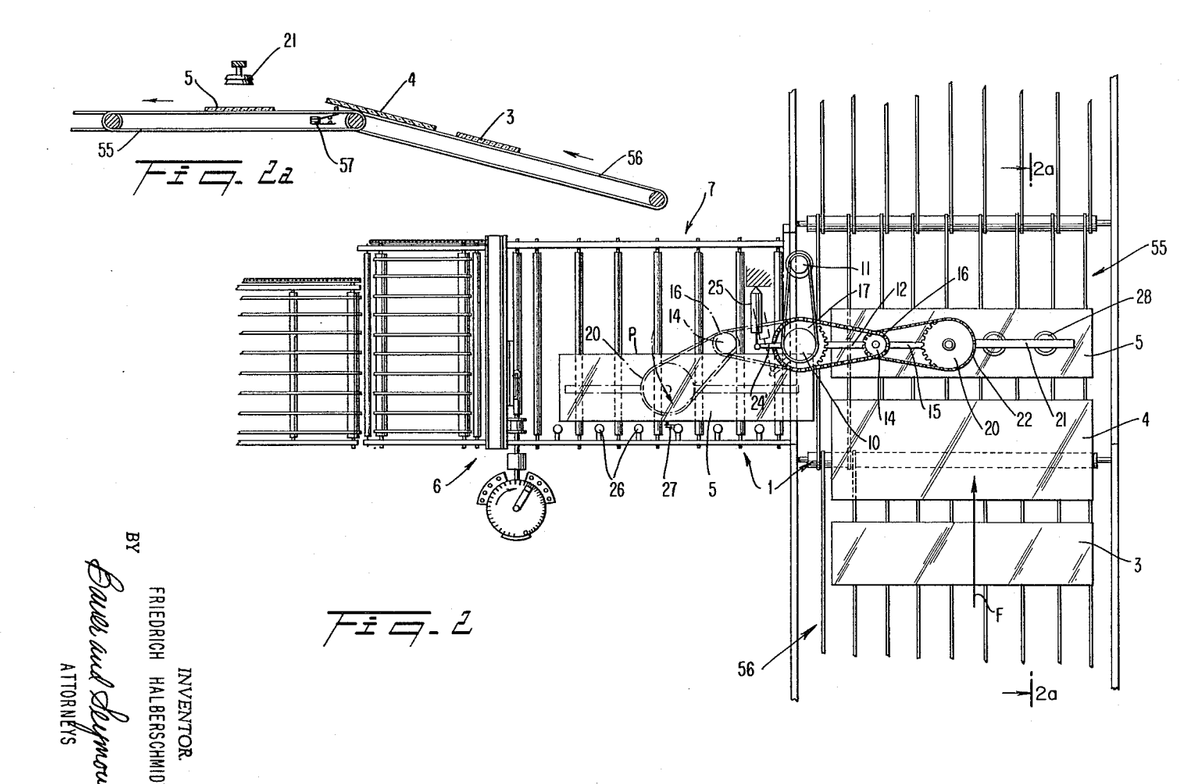
FIG. 2 is a top plan view along line 2—2 of FIG. 1.
FIG. 2A is a side elevation view of the mechanism for locating the center of each sheet of glass, said view taken along line 2A—2A of FIG. 2.

Referring now to the drawings and more particularly to FIGS. 1 and 2, there is shown a main conveyor 1 and a secondary or cross-conveyor 7 positioned at right angles to each other but at approximately the same elevation. Sheets of glass 3, 4 and 5 of varying widths are carried by the main conveyor in the direction of the arrow F. A glass sheet cutting mechanism 6 is operatively connected to the secondary conveyor. The glass sheets on main conveyor 1 are continuously advanced. The glass sheets on secondary conveyor 7 are intermittently interrupted in their movement to permit the operation of the cutter 6.

The sheet transfer mechanism comprises a shaft 8 mounted in a bearing 9 and having at one of its extremities a pulley 10 which is driven in a suitable manner by a motor 11. An arm 12 is fixed to the other extremity of shaft 8 and is provided at its unengaged end with a bearing 13. A shaft 14 is journaled in bearing 13 and has an arm 15, whose effective length is equal to arm 12, secured to its lower end. A sprocket 16 is fixed to the upper end of shaft 14. A sprocket 17 is journaled for rotation about the axis of and with respect to shaft 8 and is positioned in horizontal alignment with sprocket 16. Sprocket 17 has a diameter twice that of the sprocket 16 and both sprockets are operatively joined by a conventional chain or other equivalent means equipped with tighteners 34 carried by arm 12. If the sprocket 17 is fixedly held, a rotary movement transmitted to shaft 8 will cause the distal end of arm 15 to describe a straight line between the two limit positions shown in FIG. 1.

A cylinder 18 is secured to the end of arm 15 and has a piston 19 therein and a piston rod 20a the outer end of which has secured to it the suction-cup frame 21. The frame 21 has a series of suction cups 28 secured to its lower surface for engaging a glass sheet. Each of the suction cups is connected to an internal chamber in frame 21 and said chamber is connected through conduit 21a, FIGURE 5, to a source of vacuum which is selectively turned on and off to either grip the sheet or to release it. The frame 21 and the suction cups may be raised or lowered by actuating piston 19 by means of directing compressed air to one side or the other thereof. If the device were limited to the mechanism just described, the suction cup frame would be rotatable as a unit with the distal end of arm 15, upon passing from one extremity to the other of the rectilinear path of the piston rod. Such a movement, when controlled, can be advantageous. Therefore, the device has the following mechanisms to compensate for this rotation by creating an equal rotation in the opposite direction so that the frame and consequently the sheet of glass suspended from it will move in translation only. Referring more particularly to FIGURE 5, a shaft 20 has its upper end fixed to sprocket 22 and depends into cylinder 18 axially thereof. The lower end of shaft 20 passes into an axial bore in shaft 20a. The two shafts are interconnected for example by a splined connection so that sprocket 22 and both shafts are constrained to rotate as a unit while, at the same time, piston 19, shaft 20a and frame 21 which is attached to the lower end of shaft 20a, may move vertically as a unit with respect to shaft 20 and sprocket 22, in response to the introduction of pressure fluid into one end or the other of cylinder 18. A chain connects sprocket 22 to a second sprocket 23 which is journaled for free rotation about the axis of shaft 14 and in horizontal alignment with sprocket 22. Sprocket 23 has a diameter equal to one-half the diameter of sprocket 22 and is selectively locked to arm 12 by the following mechanism. An arcuately shaped sector 35 is formed as an integral part of sprocket 23 (FIGS. 3 and 4) and has a series of pin receiving holes extending therethrough. Directly above sector 35 and secured to arm 12 is a pin 12a which is actuated by a conventional spring-loaded electromagnetic device. When the electromagnet is energized the pin 12a is raised and the sprocket 23 is released from arm 12. When the sprocket 23 and the arm 12 are locked together the rotation of arm 12 has the effect of transmitting to the rod 20 a rotation that is equal and in a direction opposite that of cylinder 18 so that the frame 21 remains parallel to itself in the rotation of the device around the axis of shaft 8.

When the suction cup frame comes to rest on the sheet of glass which it is going to carry to conveyor 7, the frame has to accompany the sheet over a certain distance along the main conveyor 1 so as to permit the air in the suction cups to be evacuated and the cups to securely grip the sheet. In order to permit the movement of the frame with the sheet on the main conveyor it is necessary that sprocket 23 be released or unlocked from arm 12. This is accomplished by the actuation of the electromagnet which raises the locking pin 12a as described above. When sprocket 23 is so released the frame is free to move as a unit with sheet 5 since, at this time, arms 12 and 15 are free to pivot about the axes of shafts 8 and 14, respectively. Sprocket 17 in which the shaft 8 is freely rotating is not permanently stationary. By means of a rod 24 sprocket 17 is connected to the piston 24 of a cylinder 25 which has one end pivotally secured to a fixed portion of the apparatus. Compressed air is fed to this cylinder by means of an electromagnetic valve 39 having four positions of operation. The electromagnetic valve will be hereinafter more fully described but through it the piston in cylinder 25 can be moved in two directions, the piston can be locked against any movement and the piston can be freely floating with no pressure on either side thereof in a neutral position. It can thus be seen that if the electromagnetic valve of cylinder 25 is placed in a neutral position, and if the sprocket 23 is unlocked from arm 12, arm 15 may pivot in the bearing 13 to permit the desired positioning of the suction cup frame. The frame is also capable of making a slight angular movement resulting from the unlocking of sprocket 23. When the suction cups have gripped the glass sheet the sheet can be lifted by actuating the piston 19.

When the sheet is lifted the sprocket 23 is locked to the arm 12 by the de-energization of the electromagnet controlling pin 12a. At the same time sprocket 17 is immobilized by piston 24 and the motor 11 causes the rotation of shaft 8 which in turn drives, by means of arms 12 and 15, the movement of the frame and the sheet of glass through a path of movement parallel to itself at a sinusoidal speed until the position shown by the dotted lines in FIG. 1 is reached.

It is highly desirable that each sheet of glass be deposited at a predetermined location on the secondary conveyor. The following mechanism controls this operation. A plurality of vertically extending rollers 26, FIG. 2, are positioned along one edge of the secondary conveyor 7. Each of the rollers is mounted for free rotation and each roller is preferably covered with a resilient material. A limit switch 27 is mounted between a pair of these rollers and has an actuating lever which extends slightly beyond the circumferential surface of the rollers so that the switch will be actuated whenever a sheet is moved into contact with the rollers. In its normal operation a glass sheet is carried from the main conveyor to a position over the secondary conveyor. At this point the sprocket 23 is unlocked from arm 12 and piston 24 in cylinder 25 is moved downwardly, as viewed upon FIGURE 5, to cause sprocket 17 to rotate through a small arc in a counterclockwise direction, as viewed in FIG. 2. This rotation actuates the rotation of sprocket 16 and the arm 15 which is connected thereto. By means of this arrangement it is possible to transmit to the sheet of glass a movement toward the right or left of its rectilinear path and to move it into contact with the rollers 26 at one edge of secondary conveyor 7. When the sheet contacts roller 26 it also actuates the limit switch 27 which in turn stops the horizontal movement of the sheet, actuates piston 19 to cause the sheet to be lowered onto secondary conveyor 7 and to then admit air into the suction cups to release the sheet of glass. In FIG. 2 there is shown a schematic view of this movement. On the lefthand side it can be seen that the sprocket 22 and the extremity of arm 15 carrying it can pivot in the direction of the arrow $P_1$. Since the sprocket 22 can freely revolve around its axis as a result of the unlocking of sprocket 23, the sheet of glass can be precision aligned against the plurality of rollers 26. Each sheet of glass regardless of its width can thus be positioned with one edge in contact with rollers 26. Also this mechanism will align a series of glass sheets each of which is of a different width.

A limit switch 42, FIGURE 1, is mounted between the rollers of secondary conveyor 7 and having an actuator which extends above the common plane determined by the uppermost linear element of each roller, so that switch 42 is actuated whenever a sheet of glass is placed on conveyor 7. The actuation of switch 42 prevents the downward movement of the following sheet. It can thus be seen that this device makes it possible, by working in a plane situated above the conveyors, not to hamper the operations taking place on the conveyors, and to form a buffer means making it possible to store a sheet of glass and to release it only when the required conditions are fulfilled. It is of course not necessary to work in each operation between the limit points likely to be reached by the extremity of the arm 15. This is important because it permits adjustment of the path of the sheet of glass depending upon the average dimensions of the sheet which is carried. All that is therefore necessary is adjusting of the limit switches.

Figure 3:
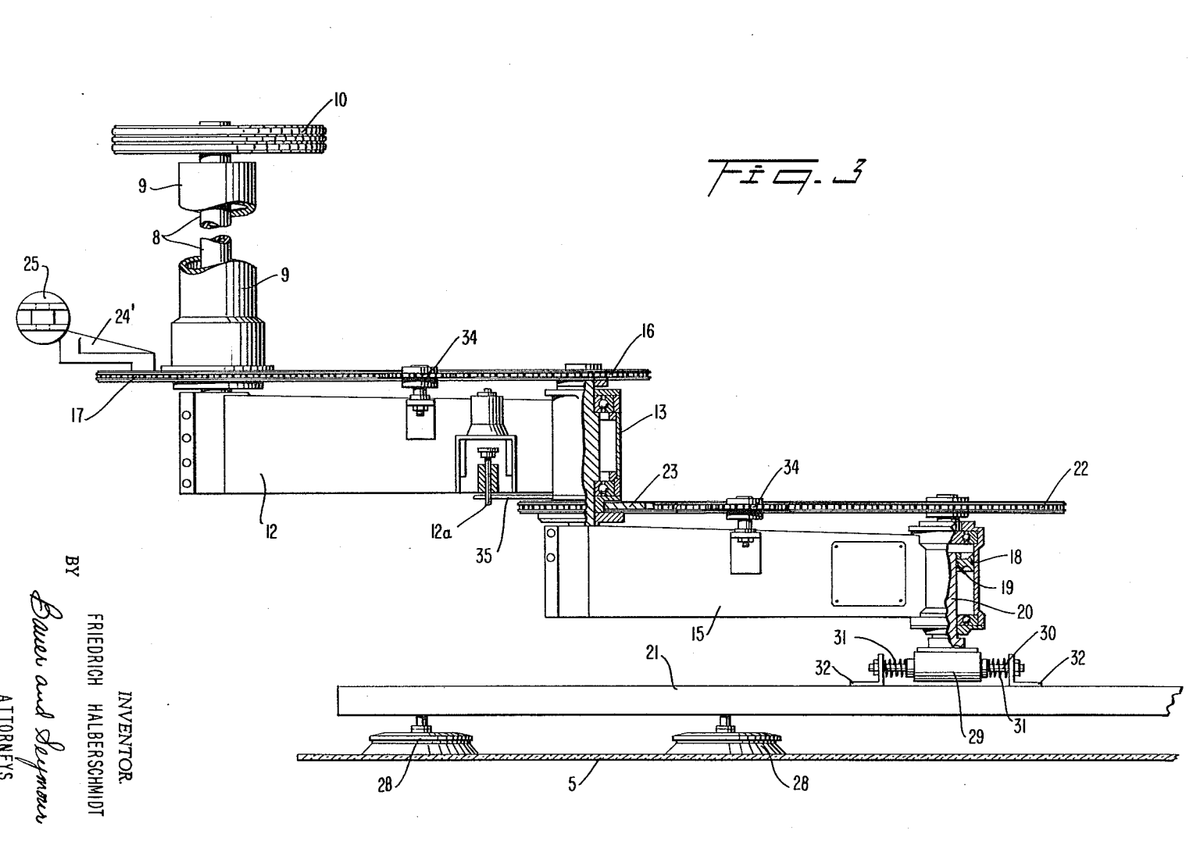
FIG. 3 is an enlarged side elevation view of the sheet transfer mechanism.

In FIG. 3 there is shown a modification of the means for securing the frame 21 to the rod 20. In this modification the frame is attached to rod 20 by means of a sleeve 29 and in which a rod 30 is able to slide. One end of each rod 30 passes through the upper end of angle irons 32 which are spaced apart and secured to the top surface of the frame. A spring 31 is telescopically mounted over each end of rod 30 and is confined between angle iron 32 and sleeve 29. This device permits a relative movement of the frame 21 with respect to arm 15 between the moment when the suction cups go into action and the moment when the sheet is raised.

Figure 4:
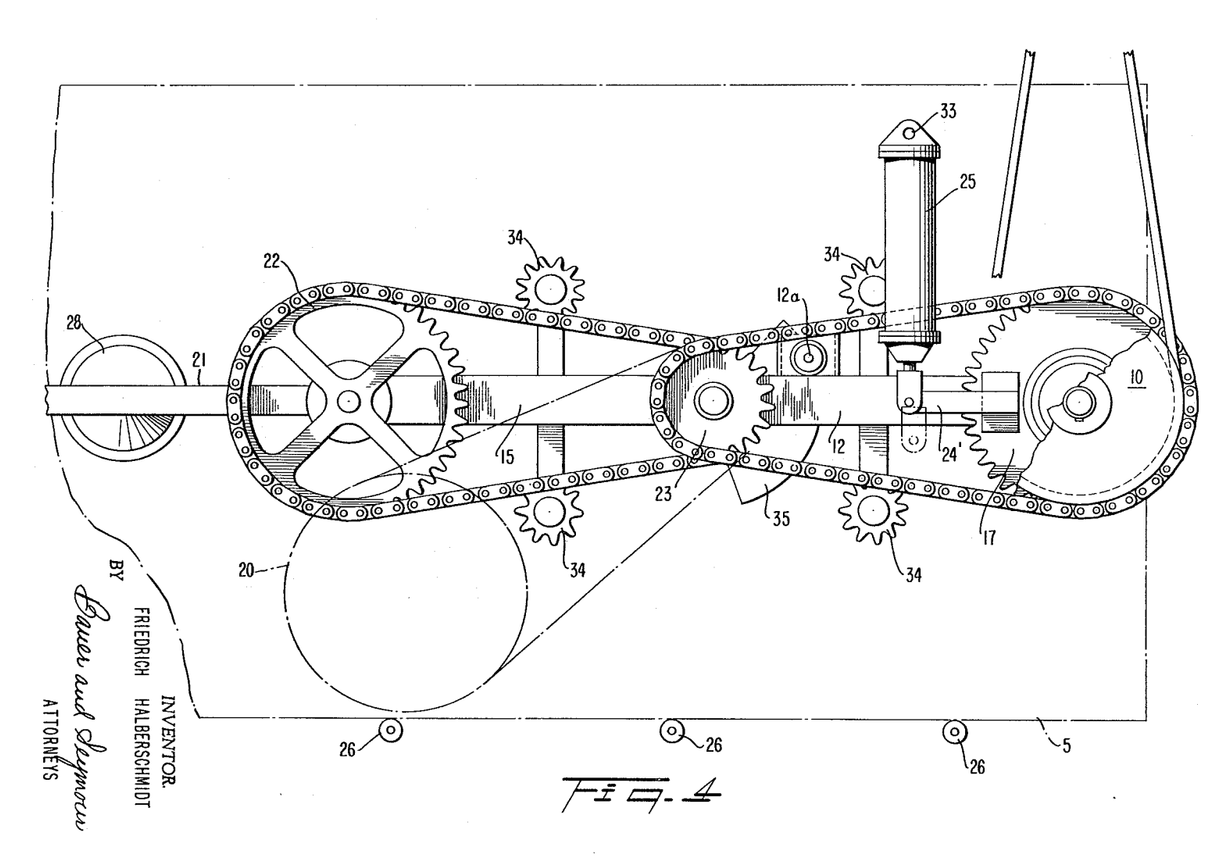
FIG. 4 is an enlarged top plan view of the sheet transfer mechanism taken along line 4—4 of FIG. 1.
Figure 5:
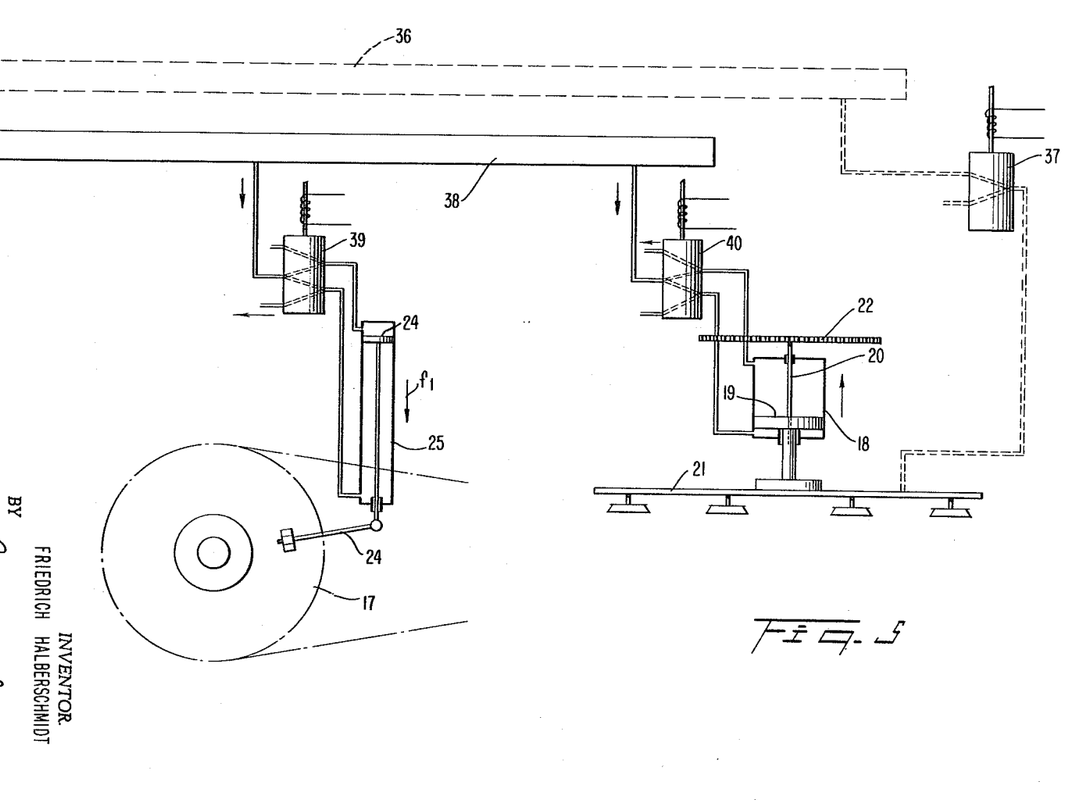
FIG. 5 is a schematic diagram of the pneumatic means for controlling the movements of the sheet transfer mechanism.

FIG. 4 shows in enlarged detail the cylinder 25 and the system for fastening arm or rod 24' to sprocket 17. The cylinder 25 is pivotally mounted at one end at 33 to permit angular displacement caused by the rotation of arm 24'.

FIG. 5 schematically illustrates the pneumatic ducts and valves for controlling the movements of piston 24, piston 19 and the vacuum to the suction cups. The vacuum line 36 connects a source of vacuum (not shown) with the suction cups. An electromagnetic valve 37, which is actuated by a contactor (not shown) selectively connects the line to the suction cups to either the atmosphere or to the vacuum line 36. The compressed air line 38 supplies both cylinders 25 and 18. Piston 24 in cylinder 25 is controlled by a four position electromagnetic valve 39. Valve 39 has the following four operating positions. Position 1—a neutral position in which piston 24 is free and in which both sides of the piston are vented to the atmosphere. This position corresponds to the moment when the suction cups are actuated to grip a sheet of glass. Position 2—a "forward" movement in the direction of arrow $f_1$, in which compressed air is admitted to the top of piston 24 and the bottom side is vented to the atmosphere. This movement corresponds to the movement of the glass sheet against the rollers 26 as shown in FIG. 2. Position 3—a "return" movement actuated by a relay, in which compressed air is admitted to the bottom side of piston 24 and the top side of the piston is vented to the atmosphere. Piston 24 is thus moved in a direction opposite from that shown as $f_1$. This movement is actuated by a relay after the sheet has been deposited on the secondary conveyor 7. Position 4—in which the piston 24 is locked in position by admitted compressed air to both sides of the piston. This position results in the locking of the sprocket 17.

Figure 6:
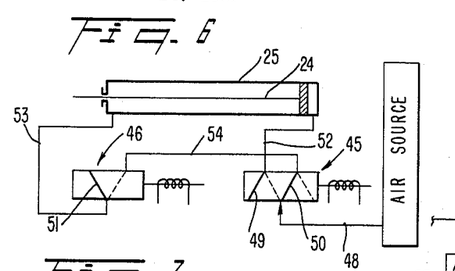
FIGS. 6, 7 and 8 show a modification of the pneumatic means shown in FIG. 5 with each of the figures showing the same pneumatic means but in different phases of its operation.
Figure 7:
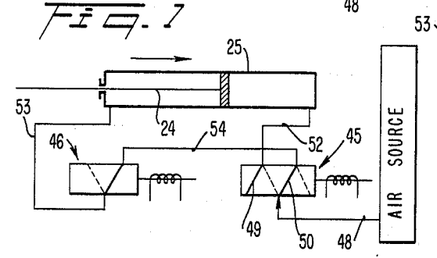
Figure 8:
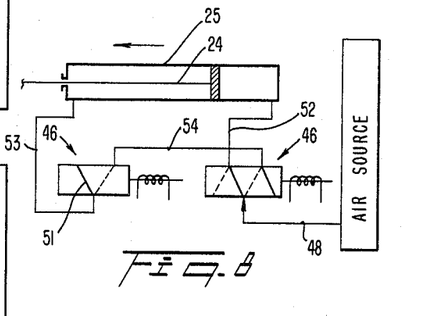

There is shown in FIGS. 6–8 a modification of the electromagnetic valve 39 comprising two electromagnetic valves 45 and 46. Compressed air is supplied to valve 45 through line 48. Valve 45 has a pair of pivotally mounted connectors 49, 50, movable in tandem, each of which is movable from a line connected position to an atmosphere connected position. Valve 46 has a pivotally mounted connector 51 movable from a line connected position to an atmosphere connected position. A line 52 connects valve 45 with one end of cylinder 25. A line 53 connects valve 46 with the other end of cylinder 25. A line 54 connects valves 45 and 46. In FIG. 6 both sides of the piston 24 are vented to the atmosphere through lines 52 and 53. This corresponds to the neutral position described above as "Position 1." In FIG. 7 said one end of the piston is vented to the atmosphere through line 52. Compressed air is fed to the other end of the piston through valve 45, line 54, valve 46 and line 53 thus moving the piston in direction $f_1$ as described above as "Position 2." In FIG. 8 said one end of the piston is vented to the atmosphere through line 53, and the compressed air is directed to the other end of the piston through lines 48 and 52. This corresponds to "Position 3" described above. The electromagnetic valve 40 which controls piston 19 in cylinder 18 and the electromagnetic valve 37 are constructed the same as and operate in the same manner as valve 39.

In FIG. 2A there is shown a mechanism for assuring that each sheet of glass, regardless of its width, will be engaged by the suction cups at its center. At the end of each complete cycle of operation the frame 21 comes to a stop at a predetermined location over the main conveyor as shown in FIG. 2A. Main conveyor 1 comprises a plurality of parallel conveyor belts 55 extending in a horizontal plane and a plurality of parallel conveyor belts 56 extending in an inclined plane as shown. A switch 57 is positioned between belts 55 in such a position that it will be actuated by a sheet of glass being placed on the belts. In operation a glass sheet is fed along and off the ends of belts 56. When the center of the sheet is fed off the end of belts 56 the sheet drops down onto the belts 55 which in turn actuates switch 57. In this manner the center of each sheet is located regardless of the width of the sheet fed onto belts 56. Switch 57 through a relay mechanism starts the cycle of operation so that the suction cups will always be lowered in timed relation with the movement of a sheet on the belts 55 measured from a given point on said belts. Each sheet is thus assured of being gripped at its center by the suction cups.

Figure 9:
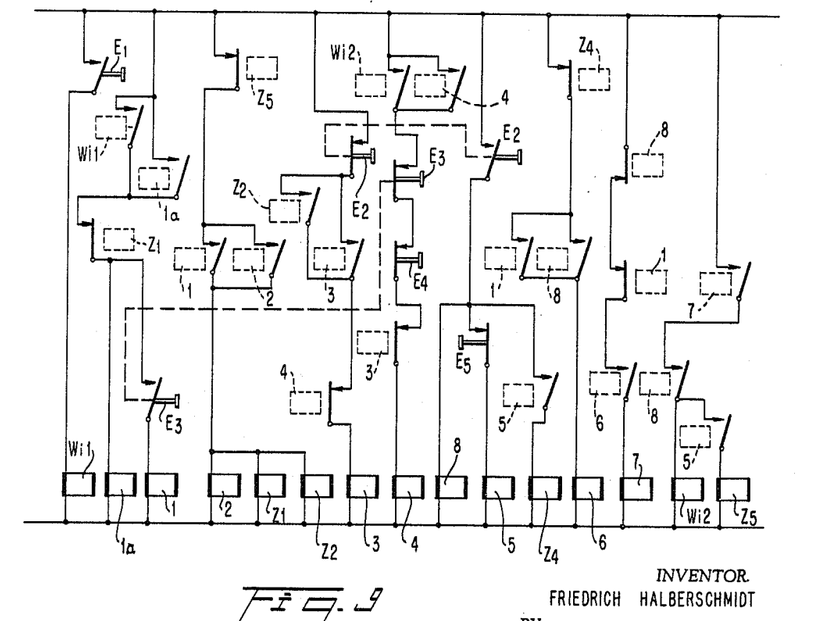
FIG. 9 is a wiring diagram showing the means controlling the sequential operation of the sheet transfer means.

In FIG. 9, there is shown a schematic wiring diagram showing the means for controlling the operation of the sheet transfer means through a complete cycle of operation. Contactor 1 controls the movements of piston 19, contactor 2 opens and closes the vacuum line 36 connecting suction cups 28, contactors 3 and 4 control respectively the forward and backward movements of the apparatus, contactor 6 locks or unlocks the sprocket 17 and contactor 7 causes the lateral displacement of the glass sheet towards its laying position. Contactors 1, 2, 3 and 4 are of the self-energizing type. Passage relays $Wi_1$ and $Wi_2$ are of the type which is activated when the current on their feed line is interrupted. $Z_1$, $Z_2$, $Z_3$, $Z_4$, and $Z_5$ are time relays which are activated after a predetermined delay. $E_1$, $E_2$, $E_3$, $E_4$ and $E_5$ are limit switches. In FIG. 9 the diagram is shown in its starting position ready to transport a new glass sheet. The cycle of operation is started when a sheet of glass carried forward by the belts 55 closes switch 57 which in turn closes $E_1$. Current is then fed on passage relay $Wi_1$. The sheet continuing its forward movement, switch 57 is opened which in turn opens $E_1$ and activates $Wi_1$. $Wi_1$ closes contactors 1 and 6 thus lowering the suction cups into contact with the glass sheet and simultaneously unlocking sprocket 17. The closing of contactor 1 causes the closing of contactor 2 which actuates electromagnetic valves 37 thus connecting the suction cups with the vacuum source. Time relays $Z_1$ and $Z_2$ are simultaneously activated. After a predetermined delay, time relay $Z_1$ opens, thus opening contactor 1. The frame supporting the suction cups fixed on the sheet is thus raised back. Then time relay $Z_2$ is closed and causes the forward movement of the arm 12 through contactor 3 which actuates motor 11. At the end of this forward movement arm 12 actuates limit switch $E_2$. The forward movement of arm 12 is thus stopped and simultaneously contactors 5 and 8 are closed. Limit switch $E_5$ is closed if the place where the sheet of glass is to be deposited is free of another glass sheet. Time relay $Z_4$ is then activated by the closing of contactor 5. Contactor 6 is closed through contactor 8, unlocking sprocket 17. Contactor 7 is closed when the contactors 6 and 8 are simultaneously closed and causes the lateral displacement of the sheet toward its final position. Contactors 7 and 8 being closed passing relay $Wi_2$ is fed and contactor 5 being also closed, time relay $Z_5$ is activated. After a predetermined time, time relay $Z_5$ opens contactor 2 thus interrupting the feed of vacuum on the suction cups. The glass sheet is liberated on the second conveyor. Then, time relay $Z_4$ interrupts contacts 6 and 7. Passage relay $Wi_2$ is thus activated while sprocket 17 is locked. Passage relay $Wi_2$ causes through contactor 4 the backward movement of the carrying arm if limit switch $E_4$ is closed through the locking of wheel 17. At the end of its backward movement arm 12 actuates limit switch $E_3$. The movement is thus stopped, while contact 3 on the feed line 1 is closed. E is liberated when the arm begins its movement liberating contactors 4, 5 and 8. The apparatus is then ready for the next operation. During the operation of the apparatus limit switch $E_3$ is opened. The passage of another sheet over switch 57 cannot therefore start another cycle of operation and the sheet will be carried forward on the first conveyor. If the place where the glass sheet is to be deposited on the second conveyor is still at that moment occupied by the preceding sheet, limit switch $E_5$ is opened. Contactor 5 cannot then be closed. But contactor 8 is nevertheless closed causing through contactor 6 the unlocking of sprocket 17. Contactors 6 and 8 being closed, contactor 7 is also closed allowing the lateral displacement of the sheet and contactors 7 and 8 being closed, passage relay $Wi_2$ is also fed. The glass sheet is then maintained over the exact place where it is to be deposited. When the first glass sheet liberates this place, limit switch $E_5$ closes. Contactor 5 closes also thus actuating time relays $Z_4$ and $Z_5$. The cycle of operation then continues exactly as described hereabove.

The invention is, of course, not limited to the embodiment described but the various elements according to the invention may naturally be replaced by equivalent kinematic or mechanical equivalents. Thus, for instance, the alternating movement of the suction cup carrying frame can be achieved without resorting to a kinematic device described above by means of securing this frame to move along a rail or rectilinear track. In the above description, the transmission elements execute pivoting movements only with respect to one another. This arrangement is very advantageous for the construction of the various vacuum and compressed air lines may be appropriately arranged in the hinged arms. Furthermore, the device offers the advantage that when the suction cups come into contact with a sheet of glass, to have it carry along only the relatively low mass of the arm 15. This point is important because the friction of the glass on the suction cups would not be sufficient for carrying along greater masses. For clarity's sake it has been taken for granted that the conveyors are horizontal and the various movements of the device according to the invention were defined on the basis of this assumption. One can, of course, conceive of the use of this device by supposing the unit to pivot around any axis perpendicular to the main axis 8 for picking up and carrying a sheet of glass in a vertical plane.

What is claimed is:

1. A device for picking up a sheet of glass from a conveyor and transferring it to a predetermined location, comprising a frame, sheet engaging means mounted to said frame, a shaft for supporting said frame, means for mounting said shaft for rotation about a first axis, first means for moving said frame along said first axis, second means for moving said frame parallel to itself and by an alternating movement along a rectilinear path normal to said first axis, means to move said frame to either side of said rectilinear path, and means to move said frame through an angular displacement around said first axis.

2. A device according to claim 1 wherein said means for moving said frame in an alternating rectilinear movement comprises means to transform a circular rotary movement of said frame about said first axis into said rectilinear alternating movement.

3. In a device according to claim 1 an arm pivoted at one end for rotation about a second axis parallel with and offset from said first axis, said frame supporting shaft being mounted on the other end of said arm, and means for rotating said frame and said supporting shaft relative to said arm, about said first axis, through an angle at all times equal and opposite to the angle of rotation of said arm about said second axis.

4. A device according to claim 3 wherein said arm member comprises a first section and a second section joined at a second axis spaced from said first axis, means to selectively connect and disconnect said sections whereby when said sections are connected said frame moves in said rectilinear path and when said sections are disconnected said frame is moved away from its rectilinear path.

5. A device according to claim 1 wherein said second means for moving said frame comprises a rail member fixed with said first shaft normal thereto, means mounting said frame for guided translation on and along said rail through said rectilinear path, said rail being connected with said shaft for pivotal movement therewith, about an axis through the midpoint of said path.

6. A device for picking up a sheet of glass from a conveyor and transferring it to a predetermined location, comprising a frame, sheet engaging means mounted to said frame, a shaft for supporting said frame, means for mounting said frame to said shaft whereby relative movement of said frame in a plurality of directions is permitted, counter-springs for returning said frame to a predetermined position relative to said supporting shaft, means for mounting said shaft for rotation about a first axis, a first means for moving said frame along the axis of said supporting shaft, a second means for moving said frame parallel to itself and by an alternating movement along a rectilinear path about said first axis, means to move said frame to either side of said rectilinear path, and means to move said frame through an angular displacement around said first axis.

7. An apparatus to transfer a glass sheet from a first conveyor to a second conveyor comprising a frame movable from a first position overlying said first conveyor to a second position overlying said second conveyor, sheet gripping means on said frame, means to move said frame toward and away from said first and second conveyors, means to move said frame from said first position to said second position through a rectilinear path, detector means responsive to a sheet on said first conveyor to actuate said means to move said frame toward said first conveyor and to actuate said sheet gripping means, and means responsive to said frame being moved to said second position to actuate said means and to deactuate said sheet gripping means.

8. An apparatus according to claim 7 comprising means to locate the center of each sheet fed onto said first conveyor, and wherein said detector means is operated simultaneously with said location of each fed sheet.

9. An apparatus according to claim 7 comprising means to selectively move said frame to one side of said rectilinear path and in simultaneous movement with the fed sheet on said first conveyor.

10. An apparatus according to claim 7 comprising sheet detector means operatively associated with said second conveyor and spaced from said second position, means to move said frame from said second position toward said second conveyor detector means, and means actuated by said detector means to deactivate said means to move the frame in said rectilinear path.

11. The method of transferring glass sheets from a first continuously and horizontally moving conveyor to a second conveyor, also moving horizontally in a direction normal to and adjacent said first conveyor, comprising the steps of sequentially feeding sheets to the first conveyor, engaging each sheet at its center while still moving on said first conveyor, lifting each sheet in sequence above said first conveyor and moving it in translation only in the direction parallel to the movement of said second conveyor, through a horizontal rectilinear path to a predetermined position over said second conveyor, and depositing each sheet on said second conveyor after it has reached said predetermined position.

12. The method of transferring glass sheets from a first continuously and horizontally moving conveyor to a second conveyor, also moving horizontally in a direction normal to and adjacent said first conveyor, comprising the steps of sequentially feeding sheets of varying widths to the first conveyor, locating the center of each sheet fed onto said first conveyor, engaging each sheet at its center and lifting each sheet above said first conveyor, moving each sheet in translation only in the direction parallel to the movement of said second conveyor, through a horizontal rectilinear path to a predetermined position over said second conveyor, and depositing each sheet on said second conveyor after it has reached said predetermined position.

13. The method of sequentially transferring glass sheets of varying widths from a first conveyor moving horizontally in a first direction, to a second conveyor, moving horizontally in a second direction at right angles to said first direction, comprising the steps of locating in succession the center of each sheet on said first conveyor, engaging each sheet at and along said center line, lifting each sheet above said first conveyor, moving each sheet in translation through a horizontal rectilinear path normal to said first direction, to a position over said second conveyor, moving each sheet to one side of said rectilinear path to a predetermined position over said second conveyor, and depositing each sheet onto said second conveyor after said sheet has reached said predetermined position.

14. The method of transferring glass sheets from a first conveyor to a second conveyor comprising the steps of sequentially feeding sheets of varying widths to the first conveyor, sequentially locating the center line of each sheet fed onto said first conveyor, engaging said lifting each sheet at and along said center line while said sheet is in motion with said first conveyor, lifting said sheet from said first conveyor, translating said sheet through a horizontal rectilinear path normal to the path of travel of said first conveyor to a position over said second conveyor, moving each sheet transversely to one side of said rectilinear path to a predetermined position over said second conveyor, and depositing said sheet onto said second conveyor after it has reached said predetermined position.

15. An apparatus to transfer a glass sheet from a first conveyor to a second conveyor comprising a frame movable from a first position overlying said first conveyor to a second position overlying said second conveyor, sheet gripping means on said frame, a shaft for supporting said frame, means for mounting said shaft for rotation about a first axis, a first means for moving said frame along the axis of said supporting shaft, a second means for moving said frame parallel to itself and by an alternating movement through a rectilinear path about said first axis between said first and second positions, third means to move said frame through an angular displacement around said first axis, first detector means responsive to a sheet on said first conveyor to actuate said first means to move said frame toward said first conveyor and to actuate said sheet gripping means, second detector means responsive to said frame being moved by said second moving means to said second position to actuate said third moving means whereby said sheet is aligned with said second conveyor, and third detector means responsive to said sheet being aligned on said second conveyor to actuate said first moving means whereby said frame is moved toward said second conveyor and said sheet is deposited on said second conveyor.

16. An apparatus to successively transfer glass sheets from a first conveyor to a second conveyor comprising a frame movable from a first position overlying said first conveyor to a second position overlying said second conveyor, sheet gripping means on said frame, means for supporting said frame for rotation about an axis, a first means for moving said frame along said axis, a second means for moving said frame parallel to itself and by an alternating movement through a rectilinear path about said axis, a third means to move said frame through an angular displacement around said axis, first detector means responsive to a sheet on said first conveyor to actuate said first moving means to move said frame toward said conveyor and to actuate said sheet gripping means, means responsive to said sheet being positioned over said second conveyor to deactuate said second moving means and actuate said third means, means responsive to the positioning of each sheet in a predetermined position over said second conveyor to deactuate said third means and actuate said first means whereby said sheet is positioned on said second conveyor.

17. An apparatus as defined in claim 16 comprising means to locate the center of the leading sheet on said first conveyor, and means responsive to the location of the center of said leading sheet to actuate said first frame moving means.

18. An apparatus as defined in claim 16 comprising means responsive to a sheet on said second conveyor to prevent the actuation of said first frame moving means when said frame is positioned over said second conveyor.

19. In an apparatus for transferring sheets of material from a first conveyor moving in a first direction, to a second conveyor moving in a second direction at right angles to said first direction, first and second shafts, means journaling said first shaft for rotation about a fixed first axis normal to said directions, first means carried by said first shaft and mounting said second shaft for rotation about a second axis parallel with said first axis, and for movement toward and from said first axis, a frame carried by said second shaft, sheet engaging and lifting means carried by said frame, and means operable in response to rotation of said first shaft to move said second shaft and frame in straight line translation normal to said first direction and parallel to said second direction, from a first position over said first conveyor to a second position over said second conveyor.

20. The apparatus of claim 19, and power-operated means connected between said second shaft and said frame and operable to move said frame and sheet engaging means along said second axis.

21. The apparatus of claim 20, and means operable when said frame is over said second conveyor to impart an additional translation to said frame parallel to said first direction and normal to said second direction.

References Cited by the Examiner
UNITED STATES PATENTS

| | | | |
|---|---|---|---|
| 1,520,858 | 12/1924 | Cullen | 271—74 |
| 2,602,329 | 6/1954 | Bisset | 198—21 |
| 2,690,250 | 9/1954 | Coleman | 198—21 |
| 2,828,127 | 3/1958 | Joel | 271—74 |
| 2,861,699 | 11/1958 | Youmans | 214—1 |
| 2,915,201 | 12/1959 | Calehuff et al. | 214—1 |
| 3,033,381 | 5/1962 | Noble et al. | 214—1 |
| 3,039,623 | 6/1962 | Sehn et al. | 214—1 |

M. HENSON WOOD, Jr., *Primary Examiner.*

GERALD M. FORLENZA, SAMUEL F. COLEMAN,
*Examiners.*